United States Patent Office 3,225,065
Patented Dec. 21, 1965

3,225,065
DIESTER COMPOSITIONS FORMED BY THE REACTION OF PYROMELLITIC DIANHYDRIDE AND POLYHYDRIC ALCOHOLS
Thomas Joseph Hyde, Woodbury, N.J., assignor to E. I. du Pont de Nemours and Company, Wilmington, Del., a corporation of Delaware
No Drawing. Filed Sept. 16, 1959, Ser. No. 840,251
4 Claims. (Cl. 260—346.3)

The present invention relates to a new class of compounds derived from the dianhydride of pyromellitic acid. More particularly, the present invention relates to new compounds formed by the condensation of one mole of a polyhydroxy compound with two moles of pyromellitic dianhydride.

Pyromellitic dianhydride (PMDA) has been successfully employed as a curing agent for a variety of polymers, including especially the epoxy resins. In this connection, PMDA is known to endow the cured resin with excellent thermal stability and resistance to attack by organic solvents. The incidence of PMDA curing of epoxy resins on a commercial scale, however, has been limited to some extent due to the high melting point of PMDA and its relatively low solubility in common solvents.

It is an object of the present invention to prepare a new series of compounds, derived from PMDA, which have all the advantages of PMDA as a curing agent for certain polymer systems while at the same time minimizing its principal disadvantages in this connection. A further object of the present invention is to prepare such compounds by a simple and convenient technique such that the compounds are economically attractive as curing agents for epoxy and other resins. These and other objects will become apparent from a consideration of the ensuing specification and claims.

I have found that a new class of compounds may be prepared by condensing PMDA with a polyhydroxy compound having at least two alcoholic hydroxyl functions such that one molecule of the latter reacts with two molecules of the PMDA. The hydroxyl radicals react with a single anhydride group on each of the two PMDA molecules in a manner whereby the residue of the polyhydroxy compound forms a bridge between carbon atoms attached to the aromatic nuclei of the two PMDA molecules. The structure of the end-product may be represented generically as follows:

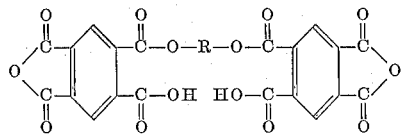

In the structure shown above "R" represents the nucleus of the polyhydroxy compound with which the two molcules of PMDA were condensed. This nucleus may be either aliphatic, cycloaliphatic, aromatic, or heterocyclic in nature, as will be more particularly hereinafter described.

The new compounds are prepared by reacting the PMDA and the polyhydroxy compound, preferably in a mole ratio of about 2:1, in a suitable organic reaction medium. A basic or acidic catalyst may be present, but is not essential. A more complete understanding of the invention will be gained from a consideration of the following examples:

Example I 350 cc. of methyl isobutyl ketone, 50 cc. of methyl ethyl ketone, 109 grams (0.50 mole) of PMDA and 85 grams (0.25 mole) of 2,2-bis[4-(2-hydroxyethoxy)phenyl]propane, which is Dow Resin X-2635 manufactured by the Dow Chemical Company, were charged to a resin pot and refluxed for two hours under a blanket of dry nitrogen. The reaction mass which resulted was a clear solution when cooled to room temperature. This solution was found to contain 38% of solid product by weight which consisted principally of the following compound:

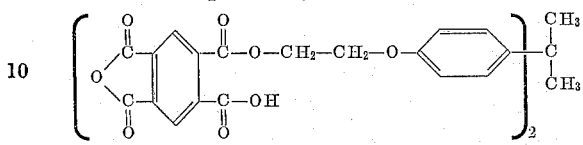

At room temperature the solubility of PMDA in this same methyl isobutyl ketone-methyl ethyl ketone solvent system is only about 3%.

Example II

The procedure of Example I was repeated with a charge of 400 cc. of acetone, 75 grams (0.25 mole) of polyoxyethylene glycol having an average molecular weight of 300, and 109 grams (0.50 mole) of PMDA. At room temperature, the reaction mass was a clear solution which was found to contain 35% of solid product by weight which consisted principally of the following compound:

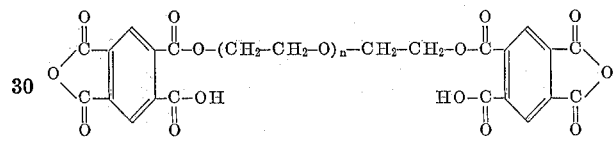

With a polyoxyethylene glycol having an average molecular weight of 300, $n=5$ in the average case. By contrast, the solubility of PMDA itself in acetone at room temperature is only about 4%.

Example III

The procedure of Example I was repeated with a charge of 400 cc. of methyl isobutyl ketone, 500 grams (0.25 mole) of polyoxypropylene glycol having an average molecular weight of 2025 and 109 grams (0.50 mole) of PMDA. Reflux conditions were maintained for six hours. At room temperature the reaction mass was a clear solution which was found to contain 67% of solid product by weight which consisted of the following compound:

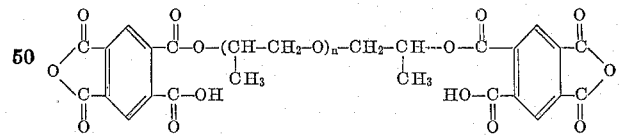

where $n=33$ in the average case.

Example IV

The procedure of Example III was repeated with a charge of 400 cc. of acetone, 33.5 grams (0.25 mole) of 1,2,6-hexanetriol and 109 grams (0.5 mole) of PMDA. Reflux conditions were maintained for three hours. At room temperature the reaction mass was clear solution containing primarily the following solid compound as the major product:

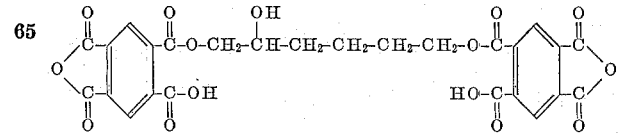

The concentration of the solid product in the final solution was thereafter increased to 37% by distilling off 100 cc. of acetone.

Example V

The procedure of Example I was repeated starting with a charge of 400 cc. of acetone, 17.3 grams (0.19 mole) of gycerol, 6.3 grams (0.06 mole) of diethylene glycol and 109 grams (0.50 mole) of PMDA. Reflux conditions were maintained for nine hours. The reaction mass was a clear solution when brought to room temperature containing 29% of a solid product consisting principally of a mixture of the following two compounds in approximately a 3:1 mole ratio:

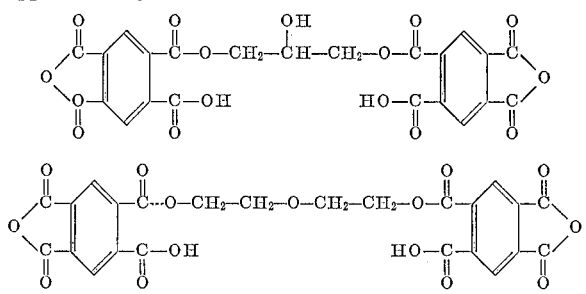

Example VI

The procedure of Example I was repeated starting with a charge of 112 grams of cresyl diphenylphosphate, 27.2 grams (0.25 mole) of PMDA and 64 grams (0.125 mole) of polyoxypropylene glycol having an average molecular weight of 1025. The mass was heated at a temperature of 120° C. for four hours. After subsequent cooling to room temperature, the reaction mass was a clear solution containing principally 45% by weight of a solid product whose generic formula is shown in Example III and wherein n=16 in the average case.

Example VII 109 grams (0.50 mole) of PMDA, 73 grams (0.25 mole) of 2,2- bis (4-hydroxycyclohexyl) propane and 320 grams ethylene glycol monoethyl ether acetate were charged to a resin pot and heated at 120° C. for 3 hours under a blanket of dry nitrogen. The reaction mass was then cooled to room temperature to yield a clear solution containing 36% of solid product which consisted principally of the following compound:

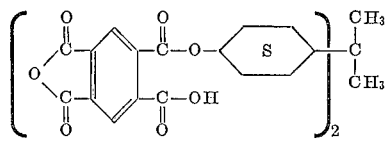

Example VIII

The procedure of Example I was repeated with a charge of 400 cc. of methyl ethyl ketone, 95 grams (0.25 mole) of 2,2-bis[4-(2-hydroxypropoxy)phenyl] propane which is available commercially as Dow Resin 565 by the Dow Chemical Company, and 109 grams (0.50 mole) of PMDA. When cooled to room temperature, the reaction mass was a clear solution which was found to contain 39% by weight principally of the following solid product:

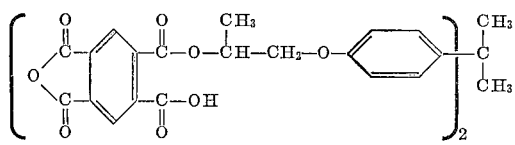

Example IX

The procedure of Example I was repeated with a charge of 400 cc. of acetone, 48 grams (0.25 mole) of tripropylene glycol and 109 grams (0.50 mole) of PMDA. At room temperature, the reaction mass was a clear solution which was found to contain 33% by weight principally of the product depicted generically in Example III and wherein n=2 in the formula there shown.

Example X

The procedure of Example I was repeated with a charge of 400 cc. of methyl ethyl ketone, 34 grams (0.25 mole) of 2,5-tetrahydrofurandimethanol, and 109 grams (0.50 mole) PMDA. Reflux conditions were maintained for eight hours. After cooling to room temperature, the reaction mass was a clear solution containing 31% by weight principally of the following product:

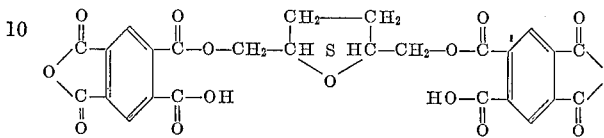

Example XI 109 grams (0.50 mole) of PMDA, 15.5 grams (0.25 mole) of ethylene glycol, and 320 grams ethylene glycol monoethyl ether acetate (available as "Cellosolve" acetate manufactured by the Union Carbide Corporation) were charged to a resin pot and heated at 120° C. for 3 hours under a blanket of dry nitrogen. The reaction mass which resulted was a clear solution when cooled to room temperature. This solution was found to contain 28% of solid product by weight, which consisted principally of the following product:

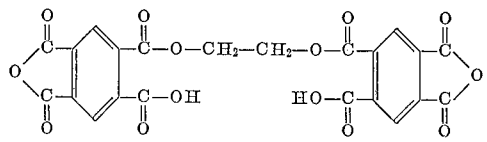

Example XII

The procedure of Example XI was repeated with a charge of 109 grams (0.50 mole) of PMDA; 22 grams (0.25 mole) 2-butenediol-1,4; and 320 grams "Cellosolve" acetate. At room temperature, the reaction mass was a clear solution which was found to contain 29% of solid product by weight, which consisted principally of the following product:

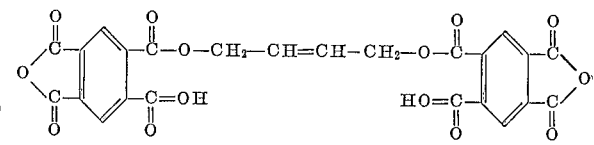

Example XIII

The procedure of Example XI was repeated with a charge of 109 grams (0.50 mole) of PMDA, 26.0 grams (0.25 mole) of neopentyl glycol, and 320 grams "Cellosolve" acetate. At room temperature, the reaction mass was a clear solution which was found to contain 30% of solid product by weight, which consisted principally of the following product:

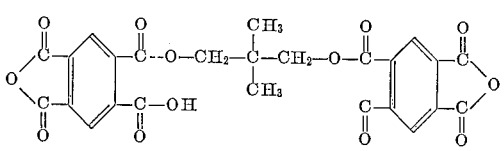

The new compounds of the present invention are represented generally by the following formula:

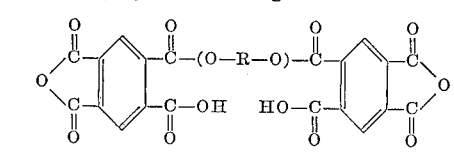

wherein O—R—O represents a divalent organic radical obtained by the abstraction of a pair of alcoholic hydroxyl hydrogen atoms of a polyhydroxy compound having at least two alcoholic hydroxyl functions.

A wide variety of polyhydroxy compounds within this category may be used in connection with PMDA for formation of the new compounds of the present invention. The polyhydroxy compound may be aliphatic, cycloaliphatic, aromatic, or heterocyclic in nature or it may be a mixed alkaryl compound, or the like. It may contain any of a variety of organic or inorganic substituents such as additional hydroxyl radicals, carboxyl groups, sulfonate radicals, halogen atoms, nitro groups, etc. Generally speaking, the —R— residue of the polyhydroxy compound may be any divalent organic radical containing any organic or inorganic substituent, except that it is best to avoid compounds containing amine functions inasmuch as amine hydrogens are even more reactive than the alcoholic hydroxyl hydrogens and in some cases might interfere with the ability of the anhydride functions to condense with the hydroxyl radicals.

In line with the foregoing, a wide variety of dihydric and polyhydric alcohols and the like are suitable for use in preparing the new compounds of the present invention, including for example, aliphatic glycols such as 1,4-butanediol, ethylene glycol, neopentyl glycol, and the like; ether glycols such as diethylene ether glycol, polyoxyethylene glycol, polyoxypropylene glycol, and the like; block-copolymer glycols formed by the successive reaction of the corresponding glycols with ethylene oxide and propylene oxide or the like; cyclic glycols, polyols, such as glycerol 1,2,6-hexanetriol and the like; diesters having terminal hydroxyl groups such as bis(β-hydroxyethyl) isophthalate and terephthalate; polyester materials with terminal hydroxyl groups such as polyethylene terephthalate, and natural products such as soybean oil and sugar, etc., containing two or more hydroxyl functions per molecule.

The new compounds may be prepared by reacting the polyhydroxy compound with PMDA in a suitable organic solvent, preferably in a mole ratio (PMDA/polyhydroxy compound) of about 2:1 inasmuch as it requires two molecules of PMDA to one molecule of the polyhydroxy compound to form the new compounds of the present invention. In other words, the reactants contain 1.0 hydroxyl equivalent for every 2.0 anhydride equivalent since the two anhydride molecules collectively and the single polyhydroxy compound molecule furnish four anhydride groups and two alcoholic hydroxyl radicals, respectively. While best results are obviously achieved with a 2:1 mole ratio of PMDA to polyhydroxy compounds, this relationship may be varied somewhat if desired. The reaction may be run with as much as three moles of PMDA or as little as 1.5 moles of PMDA per mole of polyhydroxy compound. In such cases, of course, the yield of product obtainable will be limited by the "short" reactant.

A wide variety of organic solvents may be used as a reaction medium solvent, including for example, acetone, methyl ethyl ketone, methyl isobutyl ketone, cyclohexanone, tertiary-butyl alcohol, cresyl diphenylphosphate, tris(chloroethyl)phosphate, ethylene glycol monoethyl ether acetate, and the like. In addition the solvent may be diluted with some aromatic solvent such as benzene, toluene, or xylene. Generally speaking, any organic solvent may be used in which the end-product is substantially soluble at the temperatures desired and which is inert to the product and to the reactants.

Temperature and reaction periods may be varied widely depending principally upon each other and the particular polyhydroxy compound starting material. Reflux temperatures are usually quite suitable and these will generally not exceed about 150° C. Reaction periods of from two to ten hours will result in substantial yields in most cases. Acidic or basic catalysts, both organic and inorganic, are often effective to accelerate the reaction although they are not necessary in most instances.

The reaction is run under a dry atmosphere, such as dry nitrogen or carbon dioxide, in order to exclude atmospheric moisture.

The new compounds may be isolated by conventional techniques from solution in the final reaction mass. This will often be done where the compounds are to be used as cross-linking agents in conjunction with polymer intermediates for applications where the presence of solvents cannot be tolerated, as for example, in the case of molding powders. On the other hand, in many instances, it will be quite satisfactory to retain and use the product directly in solution form to prepare formulations suitable for end-uses wherein solvents are frequently present, as for example, in the case of polymeric coatings and laminates.

The new compounds of the present invention are useful because of their ability to enter into reactions with a wide variety of polymeric materials including, for example, epoxy resins, polymers containing hydroxyl side groups such as cellulose and cellulose derivatives, vinyl and acrylic polymers and copolymers having hydroxy side groups, polyester materials containing terminal or side hydroxyl groups, polyamides having terminal amine groups, diisocyanate and diisocyanate prepolymers, various formaldehyde-based polymers such as urea-, phenol-, and melamine-formaldehyde resins, etc.

It is believed that the principal commercial use of the new compounds of the present invention, either singly or in various mixtures and combinations, will be in connection with the curing of epoxy resins. To cure epoxy resins with the new compounds, the resin and the curing agent will be mixed in suitable amounts to provide about 0.2–0.7 anhydride groups and 0.2–0.7 acid groups per epoxide group of the resin. In many instances, the epoxy resin can be cured at room temperatures if sufficient curing time is allowed, and is illustrated in Examples XIX, XXIII, and XXIV which follow. In these latter examples, cures were effected at room temperature in about a week. This is especially significant in situations where it is not feasible to bake the coated element in situ as in case of large airplane sections or maintenance of industrial equipment. Generally speaking, room temperature cures in a length of time which is short enough to be of any practical significance can be accomplished when the epoxy resin has more than 2.0, and preferably more than 2.5, functional groups of high activity per molecule, i.e., epoxy groups or combinations of epoxy groups and primary hydroxyl groups. Epoxy resins having fewer functional groups of high activity will usually cure too slowly at room temperature to accomplish a satisfactory cure in a reasonable time. In such instances, elevated temperatures are required to effect the cure and, in this connection, temperatures of 60°–200° C. may conveniently be used while temperatures in the 90°–180° C. range are preferred. At the elevated temperatures, good cures usually can be obtained in a few hours, such as 1–2 hours, and oftentimes in less than an hour. The curing of epoxy resins with the new compounds of the present invention is illustrated in the following examples:

*Example XIV*

31.5 grams of "Epon" 1001 [1] and 6.0 grams of "Epon" 1007 [2] were dissolved in 35 grams of methyl isobutyl ketone and 28 grams of xylene. To this solution, at room temperature, was added 25 grams of the solution product obtained in Example I. In the resultant solution, the equivalent ratio of anhydride to acid to epoxy groups was 0.4 to 0.4 to 1.0. This formula was applied to a steel panel by a 5-mil doctor blade and the panel was then baked at 150° C. for two hours. The polymeric coating which resulted had the following properties: 0.4 mil thick; pencil hardness greater than 9H; the panel was bent over

---

[1] "Epon" 1001 is an epoxy resin manufactured by the Shell Chemical Corporation and formed by the reaction of epichlorohydrin and bisphenol A having 0.20 epoxide group per 100 grams and a molecular weight of about 1000.
[2] "Epon" 1007 is an epoxy resin manufactured by the Shell Chemical Corporation formed by the reaction of epichlorohydrin and bisphenol A having 0.04 epoxide group per 100 grams and a molecular weight of about 4000.

a ⅛″ mandril without cracking the coating; and the resistance of the coating to boiling water and to methyl isobutyl ketone was excellent.

*Example XV*

320 grams of acetone, 85 grams of (0.25 mole) of Dow Resin X–2635 and 109 grams (0.50 mole) of PMDA were charged to a resin pot and refluxed under dry nitrogen. After a suitable reaction time, this solution was cooled to room temperature and 312 grams of "Paraplex" G–62 [3] was mixed into the solution. The resultant solution contained 61% solids and possessed an equivalent ratio of anhydride to acid to epoxide groups of 0.4 to 0.4 to 1.0. This formulation was applied to a steel panel by a 3.5-mil doctor blade and baked at 180° C. for 15 minutes. The resultant polymeric coating possessed the following properties: 0.5 mil thick; pencil hardness greater than 9H; the test panel was bent over a ⅛″ mandrel without cracking the coating; and the resistance to boiling water was good.

*Example XVI*

1200 cc. of acetone, 327 grams (1.5 moles) of PMDA and 252 grams (0.75 mole) of Dow Resin X–2635 were charged to a resin pot and refluxed under nitrogen for five hours. The solution was then cooled and 256 grams thereof was mixed with 200 grams of "Araldite" 6020.[4] The resultant formulation had a viscosity of 20 centipoises, an excellent viscosity for the preparation of laminates by the dry layup method. Prepregs were prepared by dipping glass cloth into the solution, wiping up the excess solution, and drying the prepregs in an oven for five minutes at 90° C. 12-ply laminates were prepared by subjecting the aggregated prepregs to a press temperature of 120° C. and a press cycle of 25 p.s.i. for three minutes followed by 150 p.s.i. for 10 minutes. The laminates possessed excellent translucency and a desirable amount of resin flow-out around the edges.

*Example XVII*

To 40.0 grams of the solution product obtained in Example 1, there was added 15.0 grams of 3,4-epoxy-6-methylcyclohexylmethyl - 3,4 - epoxy-6-methylcyclohexane-carboxylate, commercially available as "Resin EP 201" manufactured by Union Carbide Chemicals Company, 15.0 grams of ethylene glycol monomethyl ether acetate (which is a solvent commercially available from Union Carbide Chemicals Company as methyl "Cellosolve" acetate) and a trace amount of a suitable leveling agent. In the resultant solution, the equivalent ratio of anhydride to acid to epoxide was 0.4 to 0.4 to 1.0. This formulation was applied to a steel panel and baked at 150° C. for 30 minutes. The polymeric coating which resulted had the following properties: thickness of 0.5 mil; pencil hardness of 8H; the resistance to methyl ethyl ketone and to boiling water was good.

*Example XVIII*

400 cc. methyl isobutyl ketone, 256 grams (0.25 mole) of polyoxypropylene glycol with an average molecular weight of 1025, and 109 grams (0.50 mole) of PMDA were charged to a resin pot and refluxed under nitrogen for 2 hours. The solution was cooled to room temperature, and a clear solution was obtained containing primarily the product referred to in Example III.

25.3 grams Epon 1001, 4.8 grams Epon 1007, 16.6 grams xylene, 16.6 grams toluene, and 16.6 grams methyl isobutyl ketone were mixed together until a clear solution resulted and to this solution there was added 34 grams of the solution prepared above, 0.2 grams of alpha-methylbenzyldimethylamine as catalyst, 20 grams of ethylene glycol monomethyl ether acetate, and a trace amount of a conventional silicone resin leveling agent. In the resultant solution, the equivalent ratio of anhydride to acid to epoxide was 0.5 to 0.5 to 1.0. This formulation was applied to a steel panel and baked at 150° C. for 2 hours. The polymeric coating which resulted had the following properties: thickness of 0.9 mil; pencil hardness of 8H; good resistance to boiling water; and exceptional flexibility.

*Example XIX*

To 30 grams of the solution product obtained in Example I, there was added 15.0 grams of a poly(allyl glycidyl ether) having an epoxide equivalent per 100 grams of 0.75 and an average molecular weight of 460, 15.0 grams of ethylene glycol monomethyl ether acetate, and a trace amount of a conventional silicone resin leveling agent. In the resultant solution, the equivalent ratio of anhydride to acid to epoxide groups was 0.3 to 0.3 to 1.0. This formulation was applied to a steel panel and held at 20° to 30° C. for 7 days. The coating dried in a few hours. The polymeric coating which resulted had the following properties: 0.5 mil thick; pencil hardness of 8H; and good resistance to soaking in methyl ethyl ketone.

*Example XX*

To 25 grams of the solution product obtained in Example I, there was added 40 grams of a solution which contained 20 grams of Epon 1310 [5] and 20 grams of acetone. Next there was added 15 grams of ethylene glycol monomethyl ether acetate, and a trace amount of a conventional silicone resin leveling agent. In the resultant solution, the equivalent ratio of anhydride to acid to epoxide groups was 0.25 to 0.25 to 1.0. This formulation was applied to a steel panel and baked at 93° C. for 20 minutes. The polymeric coating which resulted had the following properties: thickness of 1.3 mils; pencil hardness of 8H; and good resistance to soaking in methyl ethyl ketone.

*Example XXI*

To 40 grams of the solution product obtained in Example I, there was added 15.0 grams of Epon 562 [6], and 15.0 grams of ethylene glycol monomethyl ether acetate. In the resultant solution, the equivalent ratio of anhydride to acid to epoxide was 0.4 to 0.4 to 1.0. This formulation was applied to a steel panel and baked at 150° C. for 30 minutes. The polymeric coating which resulted had the following properties: thickness of 1.0 mil; pencil hardness of 8H; and resistance to soaking in methyl ethyl ketone was good.

*Example XXII*

To 50 grams of the solution product obtained in Example I, there was added 20 grams of 1,3-bis[3(2,3-epoxy-propoxy)propyl]-tetramethyl-disiloxane, an epoxidized silicone resin commercially available as "Syl-Kem" 90 manufactured by the Dow-Corning Corporation, 20 grams of ethylene glycol monomethyl ether acetate, and a trace amount of a conventional silicone resin leveling agent. In the resultant solution, the equivalent ratio of anhydride to acid to epoxide was 0.5 to 0.5 to 1.0. This formulation was applied to a steel panel and baked at

---

[3] "Paraplex" G–62 is an epoxidized soybean oil manufactured by the Rohm & Haas Company, having an average molecular weight of about 1000 and approximately 0.39 epoxide equivalent per 100 grams.

[4] "Araldite" 6020 is an epoxy resin manufactured by Ciba Company, Inc. formed by the reaction of epichlorohydrin and bisphenol A having 0.46 epoxide equivalent per 100 grams and a molecular weight of about 400.

[5] Epon 1310 is an epoxy resin manufactured by the Shell Chemical Corporation and formed by the reaction of epichlorohydrin with a low molecular weight phenol-formaldehyde resin having 0.50 epoxide equivalent per 100 grams, an epoxide functionally between 3 and 4 per molecule, and an average molecular weight of about 700.

[6] Epon 562 is an epoxy resin (glycidyl ether of a polyhydric alcohol) manufactured by the Shell Chemical Corp. and formed by the reaction of epichlorohydrin with glycerol in a 3:1 mole ratio. The resin is defunctional in epoxide groups, has a 0.66 epoxide equivalent per 100 grams and an average molecular weight of 300.

180° C. for 18 hours. The polymeric coating which resulted had the following properties: thickness of 1.1 mil; pencil hardness of 8H; resistance to boiling water was excellent; and flexibility was good

*Example XXIII*

To 150 grams of the solution produced in Example I, there was added 90 grams of Dow Epoxy Resin X–2638.3 [7], 9 grams of resinous Polyol X450, 75 grams of ethylene glycol monomethyl ether acetate and 75 grams of xylene. The resinous Polyol X450 is a styrene-allyl alcohol copolymer manufactured by Shell Chemical Company having an average molecular weight of 1150, an average number of hydroxyl groups per molecule of 5.2, and a softening point of 97° C. It is an optional additive that was added to the coating formulation to promote flow-out, leveling, and cure. In the resultant solution, the equivalent ratio of anhydride to acid to epoxide groups was 0.3 to 0.3 to 1.0. This formulation was allowed to stand overnight; then it was applied to a steel panel and held at 20° to 30° C. for one week. The coating dried in a few hours. The polymeric coating which resulted had the following properties: 0.9 mil thickness; pencil hardness of 8H; good impact resistance; and excellent resistance to boiling water.

To 150 grams of the solution produced in Example I, there was added 45 grams Dow Resin X–2638.3, 33 grams of "Araldite" RD-2,[8] 15 grams "Resimene" 882, 75 grams ethylene glycol monomethyl ether acetate and 75 grams xylol. Resimene 882 (manufactured by the Monsanto Chemical Company) is a melamine-formaldehyde resin (Gardner-Holt viscosity 2, acid number less than 1.0). It is an optical additive which was added to the formulation to promote flow-out, leveling, and cure. In the resultant solution the equivalent ratio of anhydride to acid to epoxide was 0.3 to 0.3 to 1.0. The formulation was allowed to stand overnight; then it was applied to a steel panel and held at 20° to 30° C. for one week. The coating dried in a few hours. The polymeric coating which resulted had the following properties: pencil hardness of 8H; good impact resistance; and good resistance to both methyl ethyl ketone and water.

The invention has been described and illustrated in detail in the foregoing specification. It will be readily apparent to those skilled in the art that many variations and alterations may be made in the materials and compounds described as well as in their method of preparation and the techniques for using them without departing from the spirit or scope of the invention. It is intended, therefore, to be limited only by the following claims.

This application is a continuation-in-part of application Serial No. 777,599, filed December 2, 1958, and now abandoned.

I claim:

1. The following new compound:

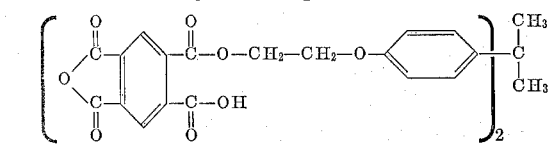

2. The following new compound:

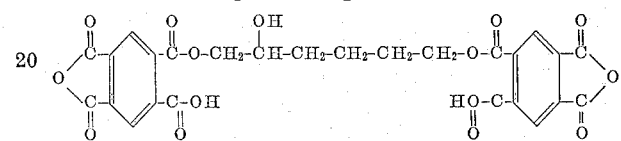

3. The following new compound:

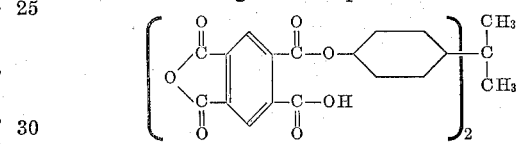

4. The following new compound:

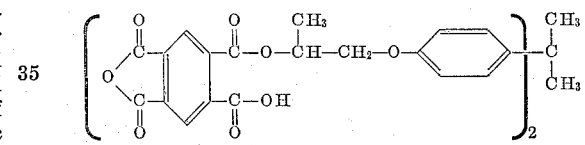

References Cited by the Examiner

UNITED STATES PATENTS

| | | | |
|---|---|---|---|
| 2,324,483 | 7/1943 | Castan | 260—47 |
| 2,509,855 | 5/1950 | Beach | 260—524 |
| 2,577,706 | 12/1951 | Hotten | 252—42 |
| 2,585,323 | 2/1952 | Elwell | 260—75 |
| 2,623,056 | 12/1952 | Elwell | 260—404.8 |
| 2,712,543 | 7/1955 | Gresham et al. | 260—346.3 |
| 2,794,811 | 6/1957 | Winstrom | 260—346.3 |
| 2,839,495 | 6/1958 | Carey | 260—47 |
| 2,947,717 | 8/1960 | Belanger et al. | 260—78.4 |

FOREIGN PATENTS 956,583  2/1950  France.

NICHOLAS S. RIZZO, *Primary Examiner.*

MILTON STERMAN, IRVING MARCUS, DUVAL T. McCUTCHEN, *Examiners.*

---

[7] Dow Resin X–2638.3 is an epoxy resin (glycidyl ether of a polyhydric phenol) manufactured by Dow Chemical Company and formed by the reaction of epichlorohydrin with a low molecular weight phenol-formaldehyde resin. Dow Resin X–2638.3 contains 0.56 epoxide equivalent per 100 grams, and an epoxide functionally between 2.2 and 3.2 per molecule.

[8] Araldite RD-2 is an epoxy resin (glycidyl ether of a dihydric alcohol) manufactured by Ciba Products Corporation and formed by the reaction of epichlorohydrin with 1,4-butanediol. The resin is difunctional in epoxide groups and has an 0.75 epoxide equivalent per 100 grams.